United States Patent
Corbrion et al.

(10) Patent No.: US 6,703,966 B2
(45) Date of Patent: Mar. 9, 2004

(54) METHOD AND DEVICE FOR MEASURING THE SPEED OF A MOVING OBJECT

(76) Inventors: Céline Corbrion, 240 rue de Charenton, 75012 Paris (FR); Jacques Lewiner, 7 avenue de Suresnes, 92210 Saint-Cloud (FR); Thierry Ditchi, 3 Sentier des Haquerons, 91310 Leuville sur Orge (FR); Eric Carreel, 5 avenue du Général Gourand, 92190 Meudon (FR)

(*) Notice: Subject to any disclaimer, the term of this patent is extended or adjusted under 35 U.S.C. 154(b) by 0 days.

(21) Appl. No.: 10/069,190
(22) PCT Filed: May 17, 2001
(86) PCT No.: PCT/FR01/01503
§ 371 (c)(1), (2), (4) Date: Aug. 2, 2002
(87) PCT Pub. No.: WO01/90774
PCT Pub. Date: Nov. 29, 2001

(65) Prior Publication Data
US 2003/0052814 A1 Mar. 20, 2003

(30) Foreign Application Priority Data
May 22, 2000 (FR) .............................. 00 06493

(51) Int. Cl.⁷ .............................................. G01S 13/58
(52) U.S. Cl. .................. 342/104; 342/111; 342/115; 342/116; 342/117; 342/192; 342/194; 342/196
(58) Field of Search ................................. 342/104, 108, 342/109, 111, 114, 115, 116, 117, 192, 193, 194, 195, 196

(56) References Cited

U.S. PATENT DOCUMENTS

| | | | | |
|---|---|---|---|---|
| 4,131,891 A | * | 12/1978 | Stavis | 342/461 |
| 4,302,758 A | * | 11/1981 | Tomasi | 342/87 |
| 4,660,040 A | * | 4/1987 | Grandos | 342/128 |
| 5,696,515 A | | 12/1997 | Zyren et al. | |
| 5,751,241 A | | 5/1998 | Lewiner et al. | |
| 6,233,045 B1 | * | 5/2001 | Suni et al. | 356/28.5 |

FOREIGN PATENT DOCUMENTS

| | | |
|---|---|---|
| DE | 19914486 | 6/1991 |
| DE | 199 14 486 C1 | 3/1999 |
| EP | 0 534 056 | 5/1992 |
| EP | 0534056 | 3/1993 |
| FR | 2 722 301 | 1/1996 |

OTHER PUBLICATIONS

"The performance of the Fourier method in detecting an accelerating target and estimating its median velocity", Yasotharan, A. Thayaparan, T.; Radar Conference, 2000. The Record of the IEEE 2000 International, 2000 Page(s): 59–64.*

"A simple method for estimating the velocity based on the Doppler shift", Ge Fengxiang; Peng Yingning; Wang Xiutan; Radar, 2001 CIE International Conference on, Proceedings, 2001 Page(s): 385–388.*

"Strengths and limitations of the Fourier method for detecting accelerating targets by pulse Doppler radar", Yasotharan, A.; Thayaparan, T.; Radar, Sonar and Navigation, IEE Proceedings–, vol.: 149 Issue: 2, Apr. 2002 Page(s): 83–88.*

International Search Report Aug. 20, 2001 EPO.

* cited by examiner

*Primary Examiner*—John B. Sotomayor
(74) *Attorney, Agent, or Firm*—Marshall, Gerstein & Borun LLP

(57) ABSTRACT

To measure the absolute speed of a body 100 moving relative to the ground 33 using an onboard speed sensor 1, a radar wave is transmitted towards the ground by an antenna with a wide aperture angle. The wave reflected by a reflecting obstacle on the ground and the transmitted wave are mixed and the frequency content of the low frequency signal obtained is determined. The speed of the moving object and the height of the transmitter and receiver antennas above the ground can then be measured by adjusting a theoretical curve to the time-varying evolution of the Doppler frequency corresponding to the reflecting obstacle.

22 Claims, 4 Drawing Sheets

Figure 4

METHOD AND DEVICE FOR MEASURING THE SPEED OF A MOVING OBJECT

BACKGROUND OF THE INVENTION

The invention relates to methods for measuring the absolute speed of a moving body relative to the ground, and to apparatuses for implementing said methods. It may be applicable to automobiles or trains.

Driving assistance and safety systems require knowledge not only of the speed of rotation of the wheels, but also of the absolute speed of the vehicle relative to the ground.

When a vehicle encounters a sheet of ice for example, and if the driver brakes suddenly, the wheels lock owing to the loss of friction between the tire tread and the road, in these conditions, a speed indicator entirely dependent on the speed of rotation of the wheels would indicate a speed of zero when the vehicle is skidding on a sheet of ice or would remain at the speed before braking, during aquaplaning.

Such a particularly dangerous situation can only be taken into account by the driving assistance systems in question if the information collected is truly representative of the actual situation.

Furthermore, conventional speed sensors commonly used today, which measure the number of rotations of the wheel of the vehicle made during a specific time period can lead to inaccurate speed measurements if there are variations in wheel diameter due for instance to poor tire inflation in the case of automobiles, or to wearing of the wheel in the case of trains, or if the vehicle is skidding on the ground.

Various methods have been suggested to overcome such a problem and to allow a measurement of absolute ground speed independent of the speed of wheel rotation to be made by using the Doppler effect.

In such methods a Doppler effect radar comprises an antenna which transmits an acoustic or electromagnetic wave towards the ground and uses the frequency shift between the frequency of said wave and that of the wave reflected by a ground element or a surface irregularity situated in the zone scanned by the radar beam, the element or surface irregularity hereafter defined as a reflecting obstacle.

This frequency shift, hereafter called the Doppler frequency and designated $f_d$, which results from the relative movement between the antenna and the reflecting obstacle is proportional to the speed of the moving body relative to the ground and to the cosine of the angle $\alpha$ defined as the angle between the direction of the wave at the reflecting obstacle, and the ground according to the equation:

$$f_d = \frac{2v\cos(\alpha)}{c} f_0$$

where $f_0$ is the transmitter frequency, v the speed of movement of the vehicle and c the speed of the wave, which leads to:

$$v = \frac{cf_d}{2\cos(\alpha)f_0}$$

Because the accuracy on the speed depends directly on the accuracy of the angle $\alpha$, Doppler effect radars use highly directional antennae having a radar beam with a small aperture angle, so that the main part of the radiation transmitted and received by the antenna is centered along an angle $\beta$ with the ground, the angles $\alpha$ and $\beta$ being equal in such situations.

A drawback of this solution arises from unexpected variations in angle $\beta$ resulting from a change in tilt of the vehicle, due for example to a modification of the load.

In order to remedy this drawback, U.S. Pat. No. 4,107,680 suggests using at least two antennae, one pointed in the direction of travel and the other pointed in the opposite direction in order to compensate for the variation in tilt.

A second serious drawback of this prior art originates from the fact that when using a narrow radar beam, a reflected wave is only generated if a reflecting obstacle is encountered on the small surface of ground scanned by the beam, this condition not being necessarily fulfilled when the ground is smooth for example, as applies in the presence of ice.

In order to remedy this second drawback, French patent n° 2 722 301 suggests instead of using a highly directional antenna, using an antenna with a wide aperture angle to increase the probability of the presence of reflecting obstacles on the ground, in the beam.

Nevertheless in this case, the angle $\alpha$ corresponding to the reflecting obstacle which reflects the wave towards the antenna constitutes an additional unknown variable.

In the said method, and in order to measure this angle and the speed, the sensor transmits simultaneously or non-simultaneously, two waves, one of fixed frequency and the other of varying frequency, the measurement of speed being made by identifying the Doppler frequencies for each of the above transmissions, produced by reflection on the same reflecting obstacle.

This method which brings a large improvement to apparatuses of this kind, requires however, sensitive instrumentation with large signal processing capacities.

The present invention which is particularly aimed at remedying these drawbacks, allows one to benefit from the advantages associated with the use of antennae with a wide aperture angle, even though it only requires simple instrumentation and simple methods of signal processing.

SUMMARY OF THE INVENTION

The present invention relates to the method of measuring the speed v of a moving object traveling in a direction parallel to the ground, the measurement being made by means of a Doppler radar with transmitter and receiver antennae fixed to the moving object at a certain height h above the ground and designed to transmit a radar beam towards the ground along a mean axis extending forwards or backwards relative to the direction of movement, said method including the following steps:

generating an electrical signal at a certain frequency by means of an oscillator, from said signal and possibly after amplification, transmitting an incident wave towards the ground, by means of the transmitter antenna having a wide aperture angle in a vertical plane, receiving a reflected wave, generated by reflection of the incident wave by a reflecting obstacle on the ground, by means of the receiver antenna with a wide aperture angle in the vertical plane, mixing together part of the electrical signal supplied by the oscillator and the received signal, possibly after amplification thereby generating two signals, one signal at a frequency equal to the sum and the other at a frequency equal to the difference of the two signal frequencies entering the mixer, filtering the signal from the mixer to generate a filtered signal proportional to the signal at a frequency equal to the frequency difference, amplifying the filtered signal at a frequency equal to the frequency difference to generate a signal called Doppler signal, looking for the different Doppler frequencies present in the Doppler signal, at close successive instants, said method being essentially characterized in that it further includes the following steps identifying in each Doppler signal obtained, Doppler frequencies at close successive instants corresponding to reflecting objects on the ground located in the zone scanned by the wave transmitted by the transmitter antenna, called identified Doppler frequencies, calculating the theoretical evolution function representing the evolution as a function of time, of the Doppler frequency corresponding to a reflecting object, for a given speed, height of the transmitter and receiver antennae above the road and position of the reflecting obstacle, selecting from the identified Doppler frequencies, those which correspond to the same reflecting obstacle at different successive instants using them to determine the speed of the moving body.

In preferred implementations of the method of the invention, use is also made of one or more of the following dispositions:

when the identification of the different Doppler frequencies is made using a Fourier transform method in order to determine the corresponding spectra, called Doppler spectra, the frequencies corresponding to the spectrum peaks in the Doppler spectra are searched for, when the identification of the different Doppler frequencies is made using a Fourier transform method in order to determine the corresponding spectra, called Doppler spectra, the Doppler spectrum is decomposed into a sum of elementary spectra corresponding to the reflecting obstacles, when the identification of the different Doppler frequencies is made using a Fourier transform method in order to determine the corresponding spectra, called Doppler spectra, a deconvolution of the obtained Doppler spectra is performed, in order to identify the Doppler frequencies corresponding to the reflecting obstacles, when the identification of the different Doppler frequencies is made using the determination of the crossovers of the Doppler signal in the time domain, the Doppler frequencies corresponding to the reflecting obstacles in the radar beam are identified by comparison with those measured at previous instants, when the identification of the different Doppler frequencies is made using a decomposition of the Doppler signal into a set of elementary time-varying responses corresponding to the reflecting obstacles, one looks among these elementary responses for those with an amplitude greater than the level of noise, one selects, among the identified Doppler frequencies, those corresponding to the same obstacle by:
  associating, from among the identified Doppler frequencies, the series of those which at successive instants, are representative of the same reflecting obstacles seen at their positions at these instants,
  adjusting, by varying the parameters of speed, and position of reflecting obstacles at a given instant, the theoretical evolution function to the evolution as a function of time, of each series of points previously defined, corresponding to each of the obstacles present in the radar beam, the final speed retained being that corresponding to the best fit, one selects, among the identified Doppler frequencies, those corresponding to the same obstacle, by performing a correlation between the Doppler frequencies identified at different successive instants and families of theoretical evolution functions in which the parameters of speed and position of the obstacle at a given instant are varied, the parameters for which one obtains the best correlation between the two being considered as the result of the measurement, the same antenna is used for transmission and reception, when the transmitter antenna is also the receiver antenna, the theoretical evolution function of the Doppler frequency corresponding to an obstacle, as a function of time is determined by applying the following equation:

$$f_d(t) = \frac{2f_0 v}{c\sqrt{1 + \frac{h^2}{(x-vt)^2}}}$$

where $f_0$ is the frequency of transmission, v is the speed of the vehicle relative to the obstacle and considered to be positive when said vehicle is approaching the obstacle, c the speed of propagation of the wave, x the position of the reflecting obstacle at a given instant measured from the projection on the ground of the position of the antenna, the angle $\alpha$ and x being related by the equation:

$$\tan(\alpha) = \frac{h}{x},$$

the height h of the antenna above the road is measured by any known sensor, the height h is measured by:
  associating, from among the identified Doppler frequencies, the series of those which at successive instants, are representative of the same reflecting objects seen at their new positions at these instants,
  adjusting, by varying the parameters of speed and position of reflecting obstacles at a given instant, and height of the antenna above the ground, the theoretical evolution function of the evolution as a function of time, of each series of points previously defined, corresponding to each of the obstacles present in the radar beam, the final height retained being that corresponding to the best fit, the height h is measured by performing a correlation between the Doppler frequencies identified at different successive instants and families of theoretical evolution functions in which the parameters of speed, position of the obstacle at a given instant and height of the antenna above ground are varied, the parameters for which one obtains the best correlation between the two, being considered as the result of the measurement, the transmitted wave is an electromagnetic wave, the frequency of the transmitted electromagnetic wave is in the range 8 GHz–80 GHz and preferably in the range 20 GHz–80GHz, the transmitted wave is an acoustic wave, the frequency of the transmitted acoustic wave is in the range 20 kHz-500 kHz and preferably in the range 30 KHz–200 kHz, when the frequency content of the calculated Doppler signal indicates the presence of a large number of reflecting obstacles in the radar beam, the Doppler frequency corresponding to the direction of maximum radiation from the transmitter antenna is selected and the speed is determined by applying the formula:

$$v = \frac{cf_d}{2\cos(\beta)f_0}$$

where β is the angle between the direction of maximum radiation from the transmitter antenna and the ground, when the frequency content of the calculated Doppler signal indicates the presence of a large number of reflecting obstacles in the radar beam, the aperture angle of the transmission is reduced, the mean speed obtained during different successive measurements is calculated.

The invention also provides an apparatus for implementing a method as defined above, the apparatus comprising:

an oscillator which supplies an electrical signal at a certain frequency, a transmitter antenna having a wide angle of aperture in a vertical plane, which transmits from said first signal or possibly from said first signal amplified, an incident wave towards the ground, a receiver antenna having a wide aperture angle in a vertical plane which receives a reflected wave generated by reflection of the incident wave on a reflecting obstacle on the ground, a mixer circuit which takes part of the electrical signal supplied by the oscillator and mixes it with the signal received by the receiver, possibly after amplification, thereby generating two signals, one with a frequency equal to the sum of the two input frequencies and the other with a frequency equal to the difference between the two frequencies at the input of the mixing circuit, a low pass filter which filters the output signal from the mixer circuit to generate a filtered signal proportional to the signal with frequency equal to the frequency difference, a low frequency amplifier which amplifies said filtered signal thereby generating a signal called the Doppler signal, means of identifying Doppler frequencies called identified Doppler frequencies in each Doppler signal obtained at close successive instants, which correspond to reflecting obstacles on the ground located in the zone scanned by the transmitted wave, means of measuring the height of the transmitter and receiver antennae above the ground, means of calculating the theoretical evolution function representative of the evolution as a function of time of the Doppler frequency corresponding to an obstacle, for a given speed, a given height of the transmitter and receiver antennae above the ground and for a given position of the obstacle, means of selecting from among the identified Doppler frequencies those frequencies corresponding to the same obstacle at different successive instants and deducting from these the speed of the moving object.

In the preferred embodiment of the apparatus of the invention, use is also made of one or more of the following dispositions:

when the identification of the different Doppler frequencies is made using a Fourier transform method in order to determine the corresponding spectra, called Doppler spectra, the identification methods look for frequencies corresponding to the spectrum peaks in the Doppler spectra, when the identification of the different Doppler frequencies is made using a Fourier transform method in order to determine the corresponding spectra, called Doppler spectra, a deconvolution of the obtained Doppler spectra is performed, in order to identify the Doppler frequencies corresponding to the reflecting obstacles, when the identification of the different Doppler frequencies is made using the determination of the crossovers of the Doppler signal in the time domain, the Doppler frequencies corresponding to the reflecting obstacles in the radar beam are identified by comparison with those measured at previous instants, when the identification of the different Doppler frequencies is made using a decomposition of the Doppler signal into a set of elementary time-varying responses corresponding to the reflecting obstacles, one looks among the elementary responses, for those with an amplitude greater than the noise level, the selection methods select from among the identified Doppler frequencies those corresponding to the same obstacle by:

associating, from among the identified Doppler frequencies, the series of those which at successive instants, are representative of the same reflecting objects seen at their new positions at these instants, adjusting, by varying the parameters of speed and position of reflecting obstacles at a given instant, and height of the antenna above the ground, the theoretical evolution function of the evolution as a function of time, of each series of points previously defined, corresponding to each of the obstacles present in the radar beam, the final height retained being that corresponding to the best fit, the selection methods select from among the identified Doppler frequencies, those frequencies corresponding to the same obstacle by performing a correlation between the Doppler frequencies identified at different successive instants and families of theoretical evolution functions in which the parameters of speed, position of the obstacle at a given instant and height of the antenna above ground are varied, the parameters for which one obtains the best correlation between the two being considered as the result of the measurement, the same antenna is used for transmission and reception, when the transmitter antenna is also the receiver antenna, the means of calculating determine the theoretical evolution function as a function of time, of the Doppler frequency corresponding to an obstacle, by applying the following equation:

$$f_d(t) = \frac{2f_0 v}{c\sqrt{1 + \frac{h^2}{(x-vt)^2}}}$$

where $f_0$ is the frequency of transmission, v is the speed of the vehicle relative to the obstacle, considered to be positive when said vehicle is approaching the obstacle, c the speed of propagation of the wave, x the position of the reflecting obstacle at a given instant, measured from the projection on the ground of the position of the antenna, the angle α and x being related by the equation:

$$\tan(\alpha) = \frac{h}{x}$$

means of measuring the height h of the antenna above the road use any known sensor.

means of measuring the height h operate by:
associating, from among the Doppler frequencies identified, the series of those which at successive instants, are representative of the same reflecting objects seen at their new positions at these instants,
adjusting, by varying the parameters of speed and position of reflecting obstacles at a given instant, and height of the antenna above the ground, the theoretical evolution function for the evolution, as a function of time, of each series of points previously defined, corresponding to each of the obstacles present in the radar beam, the final height retained being that corresponding to the best fit.

means of measuring the height h perform a correlation between the Doppler frequencies identified at different successive instants and, the families of theoretical evolution functions in which the parameters of speed, position of the obstacle at a given instant and height of the antenna above the ground are varied, the parameters for which the best correlation is obtained being considered as the result of the measurement, the transmitted wave is an electromagnetic wave the frequency of the transmitted electromagnetic wave is in the range 8 GHz–80GHz and preferably in the range 20 GHz–80 GHz, the wave transmitted is an acoustic wave, the frequency of the acoustic wave transmitted is in the range 20 kHz-500 kHz and preferably in the range 30 kHz-200 Khz, when the frequency content of the calculated Doppler signal indicates the presence of a large number of reflecting obstacles in the radar beam, methods are foreseen to select those frequencies among the Doppler frequencies which correspond to the direction of maximum radiation from the transmitter antenna, the speed is determined by applying the formula:

$$v = \frac{cf_d}{2\cos(\beta)f_0}$$

where $\beta$ is the angle between the maximum direction of radiation from the transmitter antenna and the ground, when the frequency content of the calculated Doppler signal indicates the presence of a large number of reflecting obstacles in the radar beam, methods are foreseen to reduce the aperture angle of the antenna, methods are foreseen to calculate the mean speed obtained during the different successive measurements.

BRIEF DESCRIPTION OF THE DRAWINGS

Other characteristics and advantages of the present invention appear from the following detailed description of an embodiment thereof given by way of non-limiting example and with reference to the accompanying drawings.

In the drawings:

FIG. 4 illustrates an example of the implementation of a method according to the invention for the case where a single reflecting obstacle is present in the ground zone scanned by the radar beam and where the height of the antenna relative to the ground has been determined by an independent sensor, a figure in which one can see the evolution in time of the Doppler frequency, the completion of said Doppler frequency being carried out using a rapid Fourier Transform technique (FFT), the corresponding theoretical evolution function being calculated for different values of the following parameters: position of the reflecting obstacle and speed, the function having the best adjustment being presented as a continuous line, which in this example leads to a value of speed measured of 60.01 km/h for a real speed of 60 km/h.

DETAILED DESCRIPTION OF THE INVENTION

Figure 1A:
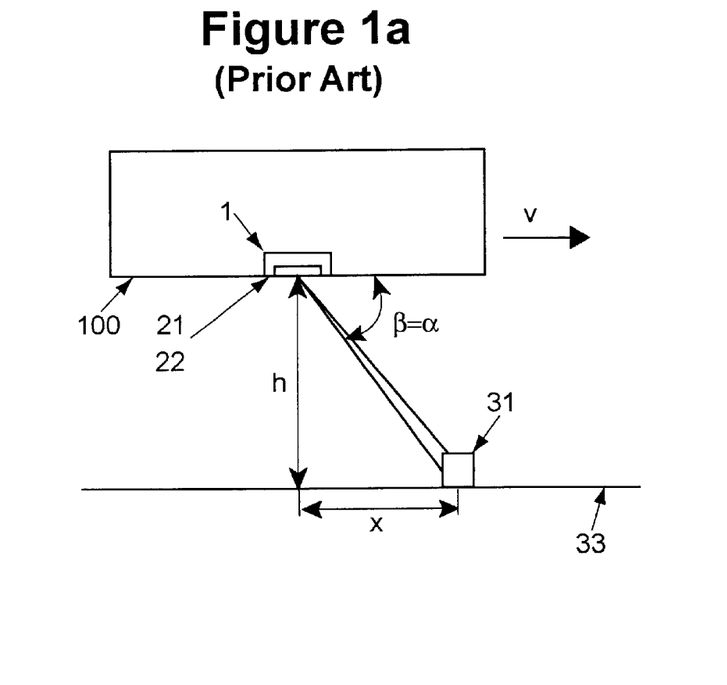
FIG. 1a is a diagrammatic overall view of a vehicle (100) fitted with a speed measuring radar according to prior art, using the Doppler effect and transmitter antenna (21) and receiver antenna (22) with a small aperture angle, located at a height h above the ground (33), the vehicle (100) moving at a speed v in the direction indicated by the arrow, a reflecting obstacle (31) located in the direction of maximum radiation of the transmitter antenna, indicated by the angle $\beta$, generating a reflected signal towards the receiver antenna (22), FIG. 1b further schematically illustrates, an example of a problem encountered while using prior art speed sensors which use the Doppler effect, and transmitter/receiver antenna with a small aperture angle located at a height h above the ground (33), the vehicle (100) moving at a speed v in the direction indicated by the arrow, in such a configuration that a reflecting obstacle (31), being neither found in the direction of maximum radiation, indicated by the angle $\beta$, nor in zone (32) of the ground scanned by the radar beam, the measurement of the speed of movement of the vehicle (100) cannot be made, FIG. 1c schematically illustrates the advantages of the speed sensor (1) using the Doppler effect and transmitter antenna (21) and receiver antenna (22) with a wide aperture angle, located at a height h above the ground (33), vehicle (100) moving at a speed v in the direction indicated by the arrow, the reflecting obstacle 31 being seen under the angle $\alpha$ which may differ from the angle at which the radiation from the transmitter antenna is maximum, previously designated $\beta$, a reflecting obstacle (31) having a high probability of being found in zone (32) of the ground scanned by the radar beam.
Figure 1B:
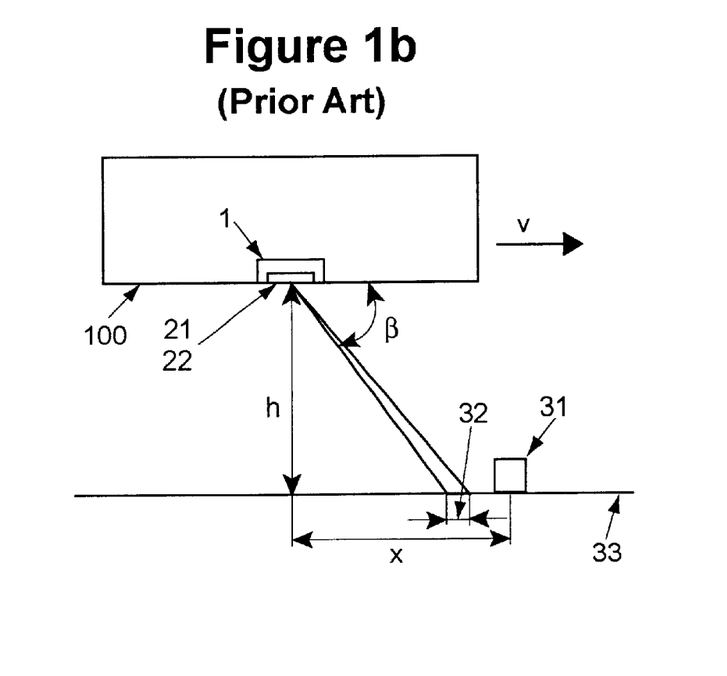
Figure 1C:
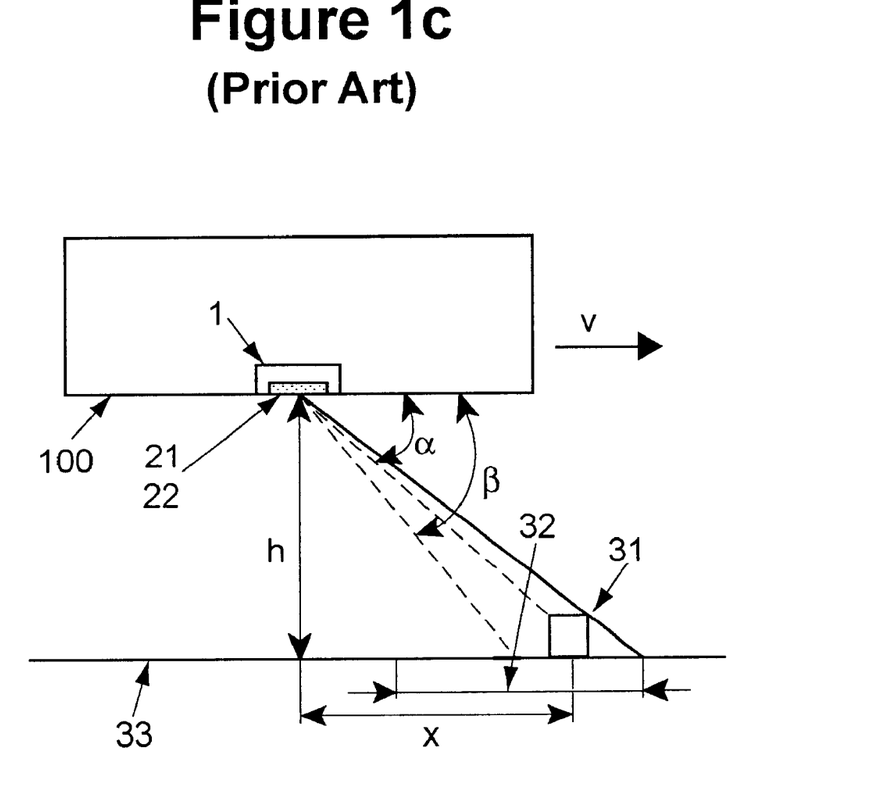
Figure 2:
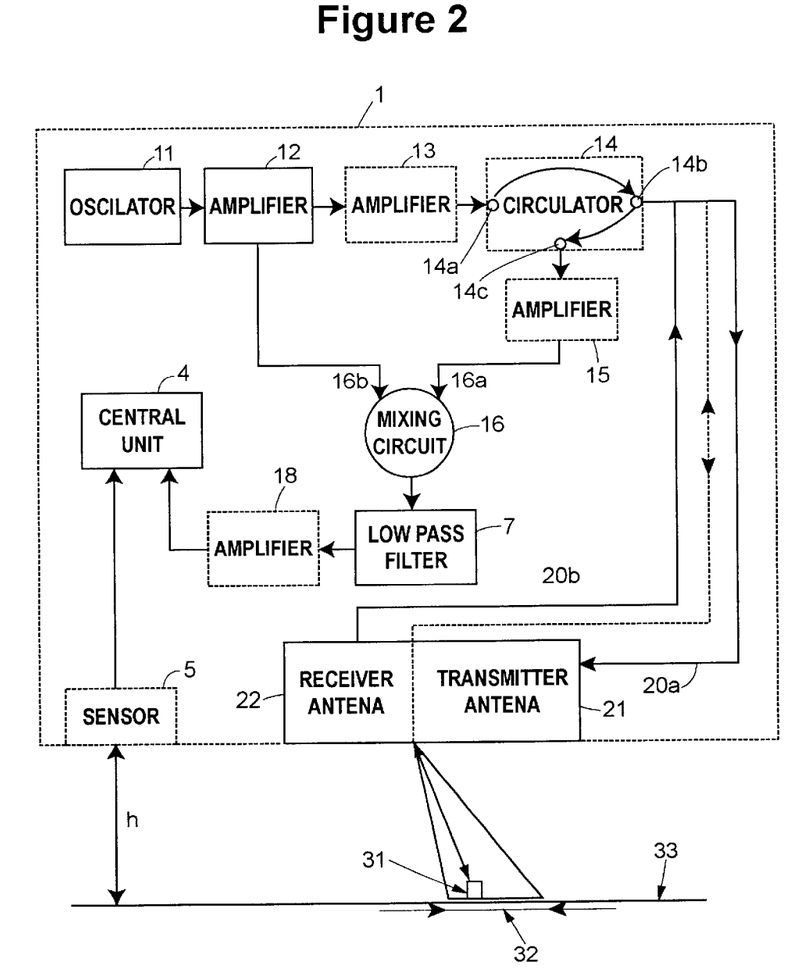
FIG. 2 is a block diagram of the speed sensor according to the invention, in which a sensor (5) is provided for measuring the height above the ground.

As shown schematically on FIG. 2, the invention aims at determining the speed v of a vehicle (100), in particular of a automobile or a train, moving along the ground, said measurement being carried out by means of a Doppler effect speed sensor which transmits a relatively wide incident radar beam towards the ground along a mean axis extending forwards or backwards.

The speed measured by the speed radar may be transmitted to a display apparatus on the dashboard of the vehicle, or to any other vehicle system such as an anti-blocking system for the wheel.

As shown schematically on FIG. 2, the speed radar may comprise:

an oscillator (11) generating an electrical signal of fixed frequency $f_0$, a transmitter antenna (21) with a wide aperture angle, transmitting a wave from a signal originating from the signal generated by the oscillator which may have passed through amplifier (12), a receiver antenna (22) with a wide aperture angle, receiving the wave reflected by a reflecting obstacle, the frequency of this reflected wave being equal to the sum of the frequency of the wave transmitted and a quantity called the Doppler frequency $f_d$ proportional to the speed of movement of the vehicle relative to the ground, and dependent on the position of the reflecting obstacle relative to the transmitter/receiver antenna, a mixing circuit (16) receiving at one of its inputs (16a), possibly after passing through an amplifier (15) the signal received by the receiver (22) and at another input (16b) part of the electrical signal sampled by a coupler (12) at the output of oscillator (11), the mixer producing two signals:

the first signal has a frequency equal to the sum of the two frequencies entering the mixing circuit i.e. (2 $f_0 + f_d$), the second signal called the Doppler signal has a frequency equal to the difference in the frequencies of the two signals entering the mixing circuit, i.e. $f_d$, a low pass filter (17) eliminates the high frequency component (2 $f_0 + f_d$) of the output signal from the mixing circuit (16) and passes the component with frequency $f_d$, a central unit (4) containing means of digitalization having a first input connected to the output of filter (17) possibly through amplifier (18), possibly a second input connected to the output of a height sensor (5), one or more outputs for processing the data representative of the speed, said central unit containing means for calculating the speed v of the vehicle from the filtered signal.

Antennae (21) and (22) are preferentially the same and in this case a circulator (14) is placed between the coupler (12) and the mixer (16) which transmits preferentially the signals from interface (14a) to interface (14b) and from (14b) towards (14c).

Amplifiers (13), (15) and (18), circulator (14), connection (20c) which replaces connections (20a) and (20b) when using a single transmitter/receiver antenna and the height sensor are represented by dotted lines in FIG. 2 to indicate that their presence is not always necessary.

Figure 3:
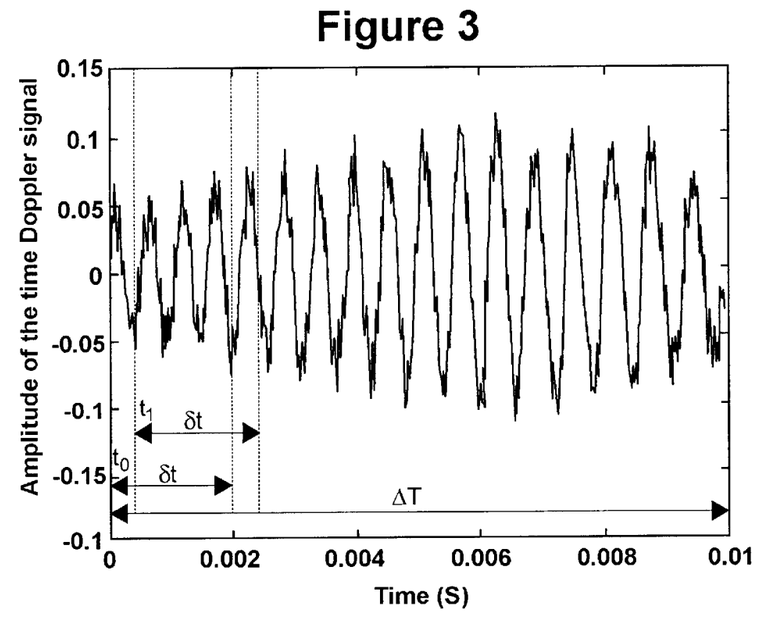
FIG. 3 represents a Doppler time signal acquired during a measurement time window $\Delta T$, said measurement time window $\Delta T$ being then divided into sub measurement time windows $\delta t$ starting a successive instants t0, t1 . . . in such a way that the sub-windows of analysis overlap each other.
Figure 4:
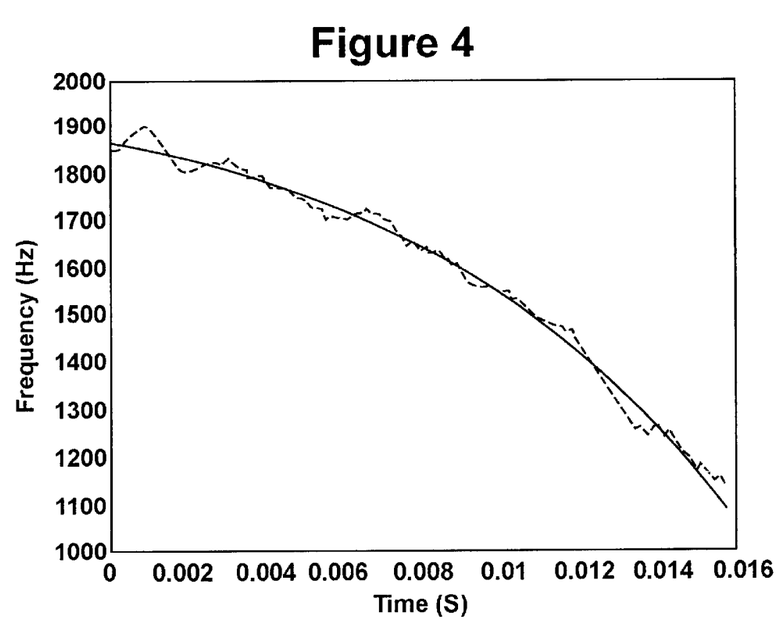

The central unit (4) is provided in order to:

perform a frequency analysis of the Doppler signal at close successive instants, the processing methods used to determine the evolution of the Doppler frequency as a function of time being a frequency space processing method (spectral method) or a time-space processing method (time-varying method), the frequency analysis being carried out at close successive instants during a first measurement time $\Delta T$ itself divided into sub measurement times $\delta t$ (FIG. 3), identify Doppler frequencies representing the reflecting obstacle on the ground, calculate the theoretical evolution function representing the evolution of the Doppler frequency corresponding to a reflecting obstacle as a function of time, for a given speed, height of the transmitter/receiver antenna above the ground and position of the reflecting object, select those frequencies from among the identified Doppler frequencies corresponding to the same reflecting obstacle at different close successive instants and to deduce from this the speed of the vehicle, said different steps being carried out as follows.

The calculation of the frequency content of the Doppler signal can be carried out using spectral or time-varying methods, when spectral methods are used, the frequency content of the signal inside each of the sub-windows hereafter called Doppler spectra may be determined by any known method such as, in a non-limiting way:

a Fast Fourier Transform method a parametric spectral analysis method a frequency-time method of analysis such as the wavelet transformation or the Wigner Ville Transformation, in the first two cases above, the various sub-windows of analysis $\delta t$ being advantageously so that they overlap in order to enable a near continuous throughput of the frequency content in time, when time-varying methods are used, the frequency content is calculated by looking for the zero crossovers of the Doppler signal in the time domain or by breaking down the Doppler signal into a sum of time-varying elementary responses of reflecting obstacles.

Identification of Doppler frequencies corresponding to reflecting obstacles on the ground depends on the way the frequency content of the Doppler signal has been determined, thereby, when spectral methods are used, the Doppler spectrum calculated for each of the sub-windows of analysis is the sum of the different frequency contributions corresponding to the different reflecting obstacles simultaneously present in the radar beam and according to the proximity of these reflecting obstacles, various situations may appear:

when the obstacles are sufficiently distant from one another, the identified Doppler frequencies on each of the Doppler spectra are the Doppler frequencies with amplitude greater than the level of noise, when the reflecting obstacles are close together, their corresponding frequencies are also close and cannot be separated due to an insufficient resolving power of the spectral analysis, the limited duration of each sub-window of analysis, limited for example by a gate function leading to a Doppler spectrum which is not composed of Dirac peaks but of cardinal sine, the separation of these close frequencies being made, for instance, by performing a decomposition of the different cardinal sines; their midband frequency and their number being determined by various known methods, for example by a gradient method combined with a random selection of starting points, when time-varying methods are used, for example by looking for the zero crossovers of the time-varying Doppler signal, the different Doppler frequencies are compared to the Doppler frequencies determined during previous measurements, which allows the Doppler frequencies to be discriminated from the noise.

The example of the method of identification of Doppler frequencies corresponding to reflecting obstacles given above is in no wise limiting and may be applied for example:

when spectral methods are used with sub-windows of analysis delimited by functions of different profiles to the gate function, for example Hamming weighting windows, the Doppler spectrum no longer being composed of cardinal sines but of cardinal sines convoluted with the Hamming Fourier Transform, the calculated spectrum still being composed of a sum of these functions and the decomposition previously described remaining valid, the various decompositions of all the contributions of isolated obstacles can also be made by deconvolution, when time-varying methods are used, for example by decomposition of the time-varying Doppler signal into the sum of elementary time-varying responses corresponding to the reflecting obstacles, the various results being characterised by a frequency and an amplitude which are compared to each other and to those obtained during previous measurements, the Doppler frequencies, determined in this way and having an elementary signal amplitude greater than the noise, being called identified Doppler frequencies.

The duration of the measurement windows $\Delta T$ are chosen so that the speed can be considered as constant during this period $\Delta T$, in such a way that the variation of the Doppler frequency is only caused by the variation of the reflecting obstacles position relative to the radar during this period.

The Doppler frequency decreases with time while the vehicle is approaching the obstacle and increases while the vehicle is moving away from the obstacle.

When the transmitter antenna is the same as the receiver antenna, the evolution of the Doppler frequency $f_d(t)$ is given by the following equation:

$$f_d(t) = \frac{2f_0 v}{c\sqrt{1 + \frac{h^2}{(x-vt)^2}}}$$

where $f_0$ is the frequency of transmission, v is the speed of the vehicle relative to the obstacle, considered positive when the vehicle is approaching, c is the speed of propagation of the wave, x the position of the reflecting obstacle at the start of the measurement window $\Delta T$ measured from the vertical axis of the transmitter, h the height of the transmitter antenna above the ground with $\alpha$ and x being related by the relation:

$$\tan(\alpha) = \frac{h}{x}$$

As way of a non-limiting example, two methods allowing the speed to be determined from knowledge of the different Doppler frequencies and the theoretical evolution function representing the evolution of the Doppler frequency corresponding to a reflecting obstacle as a function of time, when the height of the transmitter/receiver antenna above the ground is determined by any known height sensor, are given.

i) First Method

The Doppler frequencies previously identified are separated into one or more series, each series representing the evolution as a function of time of the identified Doppler frequencies corresponding to each of the reflecting obstacles present in the radar beam, the speed being then determined by adjusting the theoretical curve to the different series.

As an example, a method for determining the series of identified frequencies will be described. To this end the series of identified Doppler frequencies corresponding to the change in position of each of the reflecting obstacles is then determined. To do this, an identified Doppler frequency found in the first analysis sub-window is considered and its value is compared to the value of identified Doppler frequencies obtained in the following analysis sub-window. If the difference in frequencies is within a frequency interval compatible with the range of speeds possible for the vehicle and the range of positions of reflecting obstacles in question, taking into account the uncertainty on the frequency determination, then the two Doppler frequencies in question are considered to belong to the same series and one proceeds in the same way for each of the identified Doppler frequencies. The identified Doppler frequencies created by the noise are thereby eliminated since they belong to reduced series of a single point. In this way one or more series of Doppler frequencies representing the time-varying evolution of the position of the reflecting obstacles are defined.

The speed (v) of the vehicle and the position (x) of the obstacle at the start of the measurement window can therefore be determined by varying the parameters of speed and position in the theoretical evolution function in order to find the best possible adjustment between this theoretical function and each series of experimental Doppler frequencies.

Various optimization methods may be used. For example an error function may be constructed starting from the difference between the different Doppler experimental frequencies and the theoretical evolution function. The parameters v and x selected, being those for which the error function is a minimum.

In order to avoid the case for which the parameters obtained would correspond wrongly to a local minimum of the optimization criteria, finding these parameters may result from the combination of a gradient method for example, with a random selection of starting points. The final speed retained and the position at the start of the measurement window of the reflecting obstacles are the optimum parameters v and x which correspond to the best adjustment of the theoretical evolution function to the experimental Doppler frequencies.

ii) Second Method

In this method, one looks for the correlation between the theoretical evolution functions and the identified Doppler frequencies.

Knowing the identified Doppler frequencies at different successive intervals enables the correlation between the Doppler frequencies and the families of theoretical evolution functions when using the parameters of speed and position of the reflecting obstacle at the start of the measurement window to be determined. The parameters for which a maximum correlation is obtained are considered as the result of the measurement. Finding the parameters can often be limited to certain speed ranges taking account of the maximum possible values of acceleration of the vehicle and the speed determined in a previous measurement.

The method, object of the present invention is also applicable when the height h is not determined by an independent sensor. As a non-limiting example, two methods allowing the speed and the height to be determined from knowing the different Doppler frequencies and theoretical curves representing the evolution in time of the Doppler frequency corresponding to a reflecting obstacle, are presented.

i) First Method

The Doppler frequencies previously measured are separated into one or more series, each series representing the evolution as a function of time of the identified Doppler frequencies corresponding to each of the reflecting obstacles present in the radar beam, the speed and the height being determined by adjusting the theoretical evolution function to the different series.

As an example, a method for defining the series of identified Doppler frequencies will be described. To this end the series of identified Doppler frequencies representing the evolution/change in position of each of the reflecting obstacles is then determined. To do this, an identified Doppler frequency found in the first analysis sub-window is considered and its value is compared to the value of identified Doppler frequencies obtained in the following analysis sub-window. If the difference in frequencies is within a frequency interval compatible with the range of speeds possible for the vehicle and the range of positions of reflecting obstacles in question, taking into account the uncertainty on the frequency determination, then the two Doppler frequencies in question are considered to belong to the same series and one proceeds in the same way for each of the identified Doppler frequencies. The identified Doppler frequencies created by the noise are thereby eliminated since they belong to reduced series of a single point. In this way one or more series of Doppler frequencies representing the time-varying evolution of the position of the reflecting obstacles are defined.

The speed (v) of the vehicle and the position (x) of the obstacle at the start of the measurement window can therefore be determined by varying the parameters of speed and position in the theoretical evolution function in order to find the best possible adjustment between this theoretical function and each series of experimental Doppler frequencies.

Various optimization methods may be used. For example an error function may be constructed starting from the difference between the different Doppler experimental frequencies and the theoretical evolution function. The parameters v and x selected, being those for which the error function is a minimum.

In order to avoid the case for which the parameters obtained would correspond wrongly to a local minimum of the optimization criteria, finding these parameters may result from the combination of a gradient method for example, with a random selection of starting points. The final speed retained and the position at the start of the measurement window of the reflecting obstacles are the optimum parameters v and x which correspond to the best adjustment of the theoretical evolution function to the experimental Doppler frequencies.

ii) Second Method

In this method, one looks for the correlation between the theoretical evolution functions and the identified Doppler frequencies.

Knowing the identified Doppler frequencies at different successive intervals enables the correlation between the Doppler frequencies and the families of theoretical evolution functions when using the parameters of speed and position of the reflecting obstacle at the start of the measurement window to be determined. The parameters for which a maximum correlation is obtained are considered as the result of the measurement. Finding the parameters can often be limited to certain speed ranges taking account of the maximum possible values of acceleration of the vehicle and the speed determined in a previous measurement.

When the number of obstacles present in the radar beam increases, it is no longer possible to decompose the spectra obtained into Doppler frequencies representative of reflecting obstacles. There is thus a continuum of reflecting obstacles deposited on the road, a considerable reflection coming from the direction of maximum radiation of the transmitter antenna thus the reflecting obstacle on the road corresponding to the maximum direction of radiation from the transmitter antenna is favored and the speed is calculated using the equation:

$$v = \frac{cf_d}{2\cos(\beta_0)f_0}$$

where $f_0$ is the transmitted frequency, v the speed of the vehicle, c the speed of propagation of the wave and $\beta_0$ is the angle between the direction of maximum radiation from the transmitter and $f_d$ is the Doppler frequency measured.

When the reflecting obstacles have a variable distribution passing for example from one situation where they are well spaced to another situation where they are spread out forcing a quasi continuum, methods are provided to reduce for a short instant the angle of aperture of the antenna as soon as such a situation of a continuum of obstacles is detected, by activating for instance extra radiating elements on the radar by use of switching diodes or other switching components.

The invention is net limited to the particular embodiment described above, on the contrary it extends to all variants and in particular those where the radar itself is used to measure the height of the antenna relative to the ground by using the signal obtained for an angle around 90°.

What is claimed is:

1. A method of measuring the speed v of a moving object (100) traveling in a direction parallel to the ground (33), the measurement being made by means of a Doppler radar with transmitter (21) and receiver (22) antennae fixed to the moving object at a certain height h above the ground and designed to transmit a radar beam towards the ground along a mean axis extending forwards or backwards relative to the direction of movement, said method including the following steps:

generating an electrical signal at a certain frequency by means of an oscillator (11), from said signal and possibly after amplification, transmitting an incident wave towards the ground, by means of the transmitter antenna having a wide aperture angle in a vertical plane, receiving a reflected wave, generated by reflection of the incident wave by a reflecting obstacle on the ground, by means of the receiver antenna with a wide aperture angle in the vertical plane, mixing together part of the electrical signal supplied by the oscillator and the received signal, possibly after amplification thereby generating two signals, one signal at a frequency equal to the sum and the other at a frequency equal to the difference of the two signal frequencies entering the mixer, filtering the signal from the mixer (16) to generate a filtered signal proportional to the signal at a frequency equal to the frequency difference, amplifying the filtered signal at a frequency equal to the frequency difference to generate a signal called Doppler signal and looking for the different Doppler frequencies present in the Doppler signal, at close successive instants, said method being characterized in that it further includes the following steps:

identifying in each Doppler signal obtained, Doppler frequencies at close successive instants corresponding to reflecting objects on the ground located in the zone scanned by the wave transmitted by the transmitter antenna, called identified Doppler frequencies, calculating the theoretical evolution function representing the evolution as a function of time, of the Doppler frequency corresponding to a reflecting object, for a given speed, height of the transmitter and receiver antennae above the road and position of the reflecting obstacle, and selecting from the identified Doppler frequencies, those which correspond to the same reflecting obstacle at different successive instants using them to determine the speed of the moving body.

2. A method according to claim 1, in which when the identification of the different Doppler frequencies is made using a Fourier transform method in order to determine the corresponding spectra, called Doppler spectra, the frequencies corresponding to the spectrum peaks in the Doppler spectra are searched for.

3. A method according to claim 1, in which when the identification of the different Doppler frequencies is made using a Fourier transform method in order to determine the corresponding spectra, called Doppler spectra, the Doppler spectrum is decomposed into a sum of elementary spectra corresponding to the reflecting obstacles.

4. A method according to claim 1, in which when the identification of the different Doppler frequencies is made using a Fourier transform method in order to determine the corresponding spectra, called Doppler spectra, deconvolution of the obtained Doppler spectra is performed, in order to identify the Doppler frequencies corresponding to the reflecting obstacles.

5. A method according to claim 1, in which when the identification of the different Doppler frequencies is made using the determination of the crossovers of the Doppler signal in the time domain, the Doppler frequencies corresponding to the reflecting obstacles in the radar beam are identified by comparison with those measured at previous instants.

6. A method according to claim 1, in which when the identification of the different Doppler frequencies is made using a decomposition of the Doppler signal into a set of elementary time-varying responses corresponding to the reflecting obstacles, one looks among these elementary responses for those with an amplitude greater than the level of noise.

7. A method according to claim 1, in which one selects, among the identified Doppler frequencies, those corresponding to the same obstacle by:

associating, from among the identified Doppler frequencies, the series of those which at successive instants, are representative of the same reflecting obstacles seen at their positions at these instants, adjusting, by varying the parameters of speed, and position of reflecting obstacles at a given instant, the theoretical evolution function to the evolution as a function of time, of each series of points previously defined, corresponding to each of the obstacles present in the radar beam, the final speed retained being that corresponding to the best fit.

8. A method according to claim 1, in which one selects, among the identified Doppler frequencies, those corresponding to the same obstacle, by performing a correlation between the Doppler frequencies identified at different successive instants and families of theoretical evolution functions in which the parameters of speed and position of the obstacle at a given instant are varied, the parameters for which one obtains the best correlation between the two being considered as the result of the measurement.

9. A method according to claim 1, in which the same antenna is used for transmission and reception.

10. A method according to claim 9, in which, when the transmitter antenna is also the receiver antenna, the theoretical evolution function of the Doppler frequency corresponding to an obstacle, as a function of time is determined by applying the following equation:

$$f_d(t) = \frac{2f_0 v}{c\sqrt{1 + \frac{h^2}{(x-vt)^2}}}$$

where $f_0$ is the frequency of transmission, v is the speed of the vehicle relative to the obstacle and considered to be positive when said vehicle is approaching the obstacle, c the speed of the propagation of the wave, x the position of the reflecting obstacle at a given instant measured from the projection on the ground of the position of the antenna, the angle $\alpha$ and x being related by the equation:

$$\tan(\alpha) = \frac{h}{x}.$$

11. A method according to claim 1, in which the height h of the antenna above the road is measured by any known sensor.

12. A method according to claim 1, in which the height h is measured by:

associating, from among the identified Doppler frequencies, the series of those which at successive instants, are representative of the same reflecting objects seen at their new positions at these instants, adjusting, by varying the parameters of speed and position of reflecting obstacles at a given instant, and height of the antenna above the ground, the theoretical evolution function of the evolution as a function of time, of each series of points previously defined, corresponding to each of the obstacles present in the radar beam, the final height retained being that corresponding to the best fit.

13. A method according to claim 1, in which the height h is measured by performing a correlation between the Doppler frequencies identified at different successive instants and families of theoretical evolution functions in which the parameters of speed, position of the obstacle at a given instant and height of the antenna above ground are varied, the parameters for which one obtains the best correlation between the two, being considered as the result of the measurement.

14. A method according to claim 1, in which the transmitted wave is an electromagnetic wave.

15. A method according to claim 1, in which the frequency of the transmitted electromagnetic wave is in the range 8 GHz–80 GHz, and preferably in the range 20 GHz–80 GHz.

16. A method according to claim 1, in which the transmitted wave is an acoustic wave.

17. A method according to claim 1, in which the frequency of the transmitted acoustic wave is in the range 20 kHz–500 kHz, and preferably in the range 30 kHz–200 kHz.

18. A method according to claim 1, in which when the frequency content of the calculated Doppler signal indicates the presence of a large number of reflecting obstacles in the radar beam, the Doppler frequency corresponding to the direction of maximum radiation from the transmitter antenna is selected and the speed is determined by applying the formula:

$$v = \frac{cf_d}{2\cos(\beta)f_0}$$

where β is the angle between the direction of maximum radiation from the transmitter antenna and the ground.

19. A method according to claim 1, in which when the frequency content of the calculated Doppler signal indicates the presence of a large number of reflecting obstacles in the radar beam, the aperture angle of the transmitter is reduced.

20. A method according to claim 1, in which the mean speed obtained during different successive measurements is calculated.

21. An apparatus for measuring the speed of a moving object, said apparatus comprising:

an oscillator which supplies an electrical signal at a certain frequency, a transmitter antenna having a wide aperture angle in a vertical plane, which transmits from said first signal or possibly from said first signal amplified, an incident wave towards the ground, a receiver antenna having a wide aperture angle in a vertical plane which receives a reflected generated by reflection of the incident wave on a reflecting obstacle on the ground, a mixer circuit which takes part of the electrical signal supplied by the oscillator and mixes it with the signal received by the receiver, possibly after amplification, thereby generating two signals, one with a frequency equal to the sum of the two input frequencies, and the other with a frequency equal to the difference between the two frequencies at the input of the mixing circuit, a low pass filter which filters the output signal from the mixer circuit to generate a filtered signal proportional to the signal with frequency equal to the frequency difference, a low frequency amplifier which amplifies said filtered signal thereby generating a signal called the Doppler signal means of identifying Doppler frequencies, called identified Doppler frequencies in each Doppler signal obtained at close successive instants, which correspond to reflecting obstacles on the ground located in the zone scanned by the transmitted wave, means of measuring the height of the transmitter and receiver antennae above the road surface, means of calculating the theoretical evolution function representative of the evolution as a function of time, of the Doppler frequency corresponding to an obstacle for a given speed, a given height of the transmitter and receiver antennae above the ground and for a given position of the obstacle, and means of selecting from among the identified Doppler frequencies, those frequencies corresponding to the same obstacle at different successive instants and deducting from these, the speed of the moving body.

22. Apparatus according to claim 21, in which the same antenna having a large aperture angle is used for transmission and reception.

* * * * *

UNITED STATES PATENT AND TRADEMARK OFFICE
CERTIFICATE OF CORRECTION

PATENT NO. : 6,703,966 B2
DATED : March 9, 2004
INVENTOR(S) : Céline Corbrion et al.

It is certified that error appears in the above-identified patent and that said Letters Patent is hereby corrected as shown below:

<u>Title page,</u>
Item [75], Inventors, fourth inventor, please delete "5 avenue du Général Gourand" and insert -- 9 avenue du Général Gouraud --.

<u>Column 14,</u>
Line 55, please delete "signal" and insert -- signal, --.

Signed and Sealed this

Thirteenth Day of July, 2004

JON W. DUDAS
*Acting Director of the United States Patent and Trademark Office*